June 1, 1943. K. G. DETHRIDGE 2,320,854
VARIABLE SPEED POWER TRANSMISSION MECHANISM
Filed Sept. 17, 1940 2 Sheets-Sheet 1

INVENTOR
KENNETH GEORGE DETHRIDGE
BY Oberlin, Limbach & Day
ATTORNEYS

June 1, 1943. K. G. DETHRIDGE 2,320,854
VARIABLE SPEED POWER TRANSMISSION MECHANISM
Filed Sept. 17, 1940 2 Sheets-Sheet 2
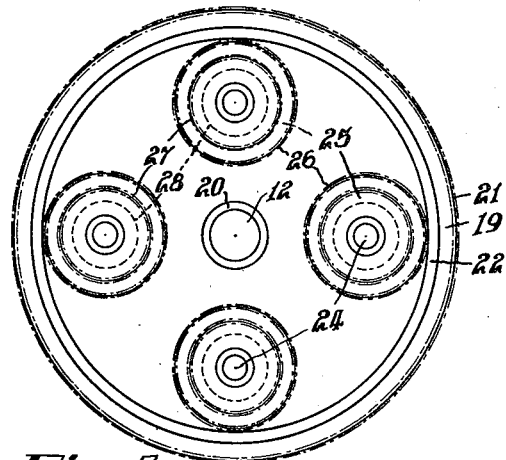
Fig. 4.
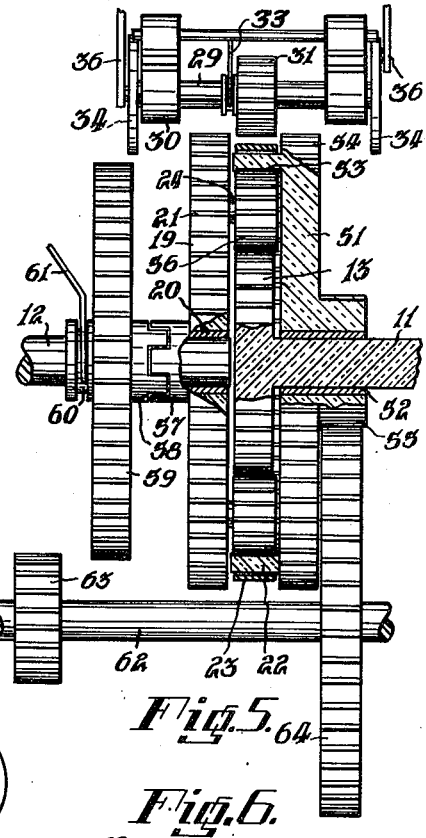
Fig. 5.
Fig. 6.
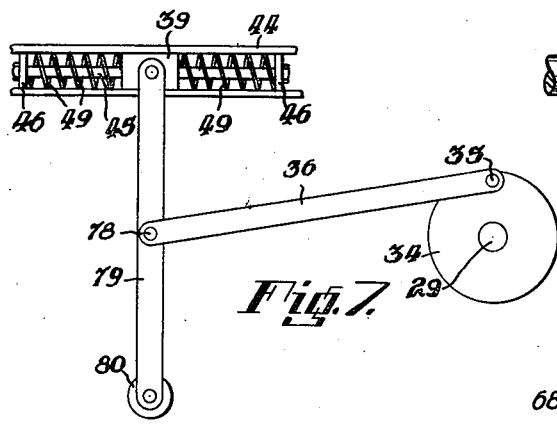
Fig. 7.
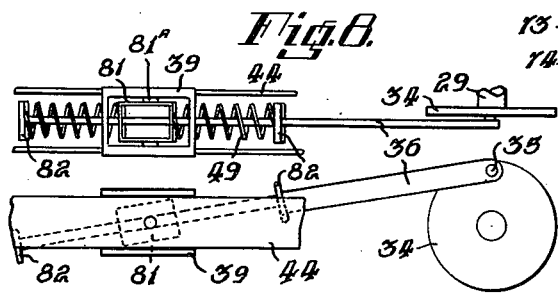
Fig. 8.
Fig. 9.
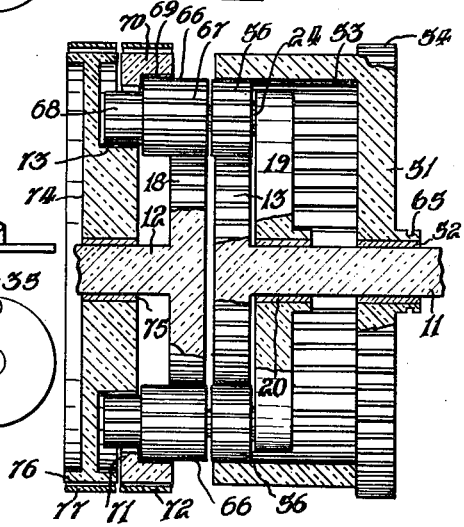
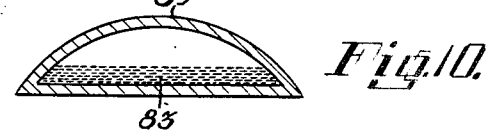
Fig. 10.
INVENTOR
KENNETH GEORGE DETHRIDGE
BY Oberlin, Limbach + Day
ATTORNEYS Patented June 1, 1943

2,320,854

UNITED STATES PATENT OFFICE 2,320,854

VARIABLE SPEED POWER TRANSMISSION MECHANISM

Kenneth George Dethridge, South Yarra, near Melbourne, Victoria, Australia

Application September 17, 1940, Serial No. 357,168
In Australia October 23, 1939

19 Claims. (Cl. 74—259)

This invention relates to improvements in variable speed power transmission mechanisms. In particular, it refers to an improved power transmission gearing, braking and clutch mechanism which provides an infinite and continuous range of gear ratios between a driving and a driven shaft such as, for example, between the shaft of an internal combustion engine and the propeller shaft leading to the differential gear of an automobile. Consequently, the driven shaft, for a set rotational speed of the driving shaft with variable power, will have a continuous and variable range of speeds and a variable power output.

It is an object of the invention to provide an automatic gear mechanism of such construction that the ratio of gearing between a driving and a driven shaft will be variable without the necessity of altering the relative arrangement and disposition of the gear integers.

A further object of the invention is to provide a power transmission mechanism of such construction that it functions as a flexible coupling to prevent undue straining of the parts in the event of a sudden stoppage of either the driving or driven shafts.

A still further object is to provide a power transmission mechanism which will automatically apply a braking force to the driven shaft so as to decrease its rotational speed should the driven shaft increase its rotational speed to such an extent that it overruns the driving shaft.

To achieve the objects hereinbefore recited, an arrangement of gears comprising an epicyclic gear mechanism which is operatively connected to one or more elements so arranged and mounted that the said elements will pulsate with damped vibratory movements. The latter mechanism throughout the following description and claims is termed "an inertia mechanism."

Reference is now made to the accompanying drawings, wherein:

Fig. 4 illustrates in side elevation the secondary or driven portion of the epicyclic gearing shown in Figs. 1 and 2.

Fig. 5 is a view illustrating an alternative arrangement of epicyclic gearing.

Fig. 6 is a sectional view showing a further alternative arrangement of epicyclic gearing.

Fig. 7 is a view in side elevation of an alternative type of inertia mechanism.

Figs. 8 and 9 are views in plan and in side elevation, respectively, of another type of inertia mechanism.

Fig. 10 shows a further type of inertia mechanism.

Figure 1:
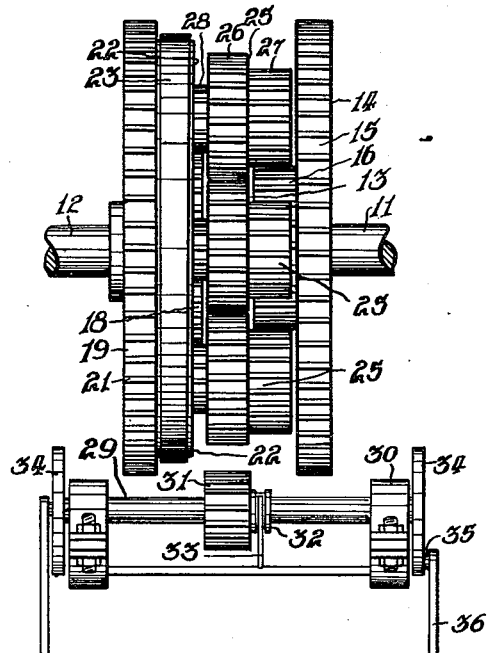
Fig. 1 illustrates in plan view one embodiment of the invention.
Figure 2:
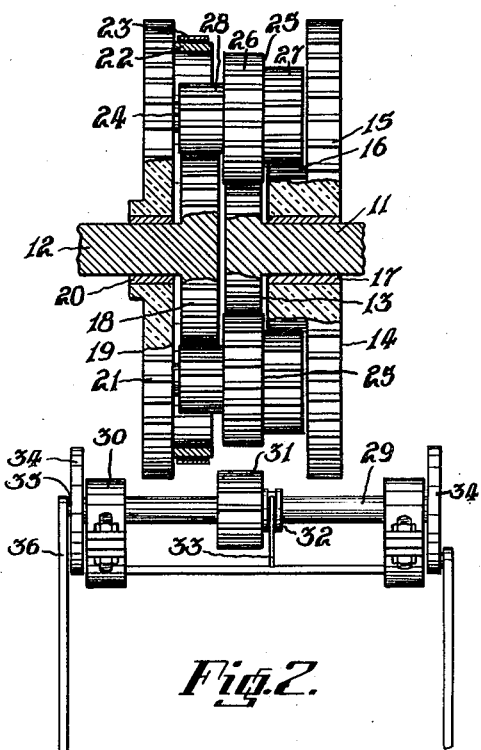
Fig. 2 is a fragmentary plan view, partly in section, of the mechanism illustrated in Fig. 1.
Figure 3:
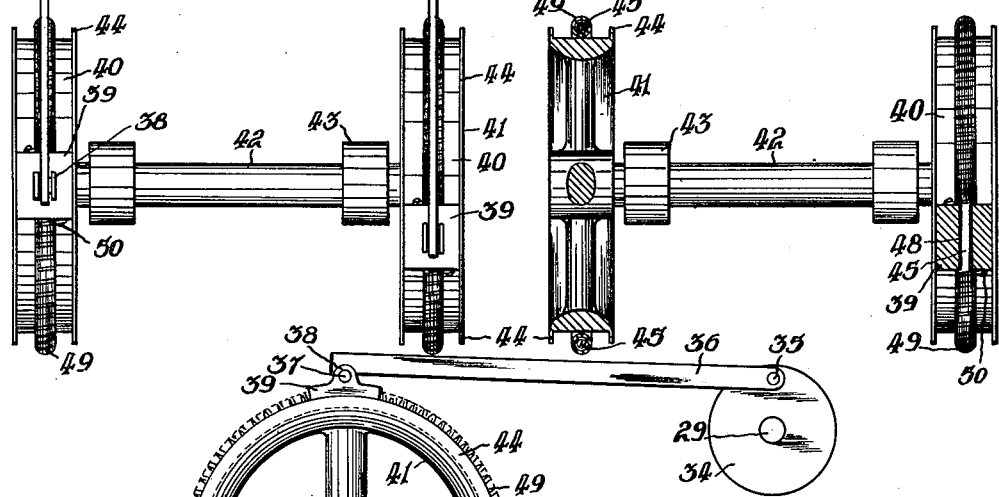
Fig. 3 is a view in side elevation of the inertia mechanism seen in Figs. 1 and 2.

Referring initially to Figs. 1 to 4, 11 designates the shaft of an internal combustion engine or other power source (hereinafter termed the engine shaft) and 12 the driven or propeller shaft which is mounted in co-axial alignment with said shaft 11. Fixed on the engine shaft is a primary driving gear wheel 13 and freely mounted on said engine shaft adjacent to the wheel 13 is a primary transmission gear wheel 14 having two co-axial sets of teeth 15 and 16 constructed as an integral unit, and a bearing sleeve 17.

A driven gear wheel 18 is fast on the propeller shaft 12 closely adjacent to the driving gear wheel 13, and journaled on said propeller shaft is a gear wheel 19 having a bearing sleeve 20, circumferential gear teeth 21 and a brake drum 22 for engagement by an external brake band 23 of conventional design and operation. The gear wheel has the same diameter as that of the gear 15 of the primary transmission gear wheel 19. A plurality of spindles 24 parallel with the shafts 11 and 12 are carried by said gear wheel 19, and on each spindle there is journaled a combination gear wheel 25 comprising an intermediate gear wheel 26 and end gear wheels 27 and 28, the pitch circle diameter of gear wheel 27 being greater than that of gear wheel 28, and the diameter of gear wheel 26 being greater than that of gear wheel 27 for the purpose to be hereinafter explained. The intermediate gear wheel 26 is in mesh with the driving gear wheel 13: the end gear wheel 27 is in mesh with the teeth 16 of the transmission gear wheel 14: and the end gear wheel 28 meshes with the driven gear wheel 18.

A shaft 29 is rotatably mounted in bearings 30 parallel with the engine and propeller shafts 11 and 12 and slidably but not rotatably fitted thereon is a gear wheel 31 having a shift collar 32 operated by a shift fork 33. The gear wheel 31 can be slidably moved on said shaft 29 so that it engages with either of the transmission gear wheels 15 or 21 which are rotatable about the engine shaft 11 and the propeller shaft 12, respectively. Secured on the shaft 29 are plates 34 having eccentrics 35 to which connecting rods 36 are fitted at one end. The opposite end of each connecting rod is coupled by a cross-pin 37 to upwardly projecting lugs 38 of a slide 39 which is adapted to travel circumferentially on the rim 40 of a fly-wheel 41. Each fly-wheel is rotatably mounted on a horizontal shaft 42 carried by brackets 43, and it has peripherical flanges 44 formed integrally with its rim 40 so that the slide 39 can travel freely in the guides which are formed thereby.

A rod 45 of circular cross-section which is almost completely circular in form is secured to the fly-wheel 41. The opposite ends of said rod are clamped by blocks 46 bolted to the rim 40 and by set-screws 47. The rod 45 concentrically encircles the rim 40 of the fly-wheel 41, and it passes through a guide hole 48 formed in the slide 39—see Fig. 2. Consequently, the rod 45 acts as a guide for said slide to retain the same in sliding contact with the rim of said fly-wheel. Two strong helical springs 49 are positioned about the circular rod 45 and they are connected at their opposite ends by bolts 50 to the clamping blocks 46 and to the slide 39 so that movement of said slide in its guideways relative to the fly-wheel 41 will set up compressional and tensional forces in the springs 49 whereby said fly-wheel will be caused to rotate.

Upon rotation of the engine shaft 11 in clockwise direction, by way of example, each of the combination gears 25 is caused to rotate in an anti-clockwise direction by reason of the engagement of each intermediate gear wheel 26 with the driving gear wheel 13. The transmission gear wheel 14 and the driven gear wheel 18 are both caused to rotate in clockwise direction relative to said combination gears 25 and the gear wheel 19 which carries the spindles 24. If the sliding gear wheel 31 be moved into engagement with the teeth 21 of the gear wheel 19 so that the variable brake acts in the manner to be hereinafter described upon said gear wheel 19, power will be transmitted from the driving gear wheel 13 through the intermediate gear wheel 26 and the gear wheel 28 to the driven gear wheel 18 and the transmission gear wheel 14 will continue to rotate freely in a clockwise direction. Therefore, the drive of the propeller shaft 12 and the engin shaft 11 is unidirectional and the mechanism is in forward gear.

Upon disengagement of the gear wheel 31 from the gear teeth 21, the end gear wheels 28 revolve on the stationary gear wheel 18 and thereby cause the gear wheel 19 to rotate in anticlockwise direction. By reason of the ratio of teeth of the gear wheels 27 and 28 of the combination gear 26, the primary transmission gear wheel 14 will rotate in clockwise direction. If the sliding gear wheel 31 is now engaged with the gear teeth 15 so as to brake the primary transmission gear wheel 14, the anti-clockwise rotation of the combination gear wheels 25 about their spindles 24 caused by the clockwise rotation of the engine shaft 11 and primary gear 13 will produce anti-clockwise rotation of the gear wheel 19 supporting said combination gear wheels 25. In consequence, the driven gear wheel 18 is acted upon by the gear wheels 28 which are rotating on the spindles 24 and are revolving about the shaft 12. The clockwise motion caused by the revolution of the gear wheels 28 about the shaft 12 is greater than the clockwise motion caused by the rotation of said gear wheels 28 about their spindles 24. The gear wheel 18 and the propeller shaft 12, therefore, will be driven in a reverse direction at a speed dependent upon the difference of speeds of said gear wheels 19 and 28.

When the gear wheel 31 which is slidably mounted on the shaft 29 is in operative engagement with either of the sets of gear teeth 15—21, the plates 34 are rotated, and through the eccentrics 35 and connecting rods 36, the slides 39 are compelled to travel on the rims 40 of their respective fly-wheels 41 with substantially reciprocatory motion. Upon the movement of each slide 39, it compresses one of the helical springs 49 and extends the other of said springs and the compressional and tensional forces of the springs thus set up act upon the fly-wheel 41 to rotate it.

The reciprocatory motion of the slide is relatively fast. By the time the inertia of the flywheel has been overcome in one direction by the forces of the springs, said slide is at the end of its forward movement and consequently, upon its travelling in a reverse direction there are set up tensional and compressional forces in the springs to rotate said flywheel in the opposite direction. In consequence, each flywheel 41 is set into oscillatory motion and the pulsating kinetic energy thus developed builds up a back pressure to prevent the reciprocatory motion of the slide 39, thereby acting as a brake upon the shaft 29, the gear wheel 31 and relative gear 15 or 21. It is to be noted that the faster the motion of the slide 39, the greater is the arc of oscillation of the flywheel 41 and the greater is the back pressure created and in consequence the greater is the power that is transmited to the driven gear wheel 18. It is to be further noted that for a uniform speed of rotation that is transmitted to the shaft 12, the oscillatory motion of the flywheel 41 will be constant, and that for a variable power output the braking effect of the inertia mechanism will be variable so that there is provided a continuous and infinite range of gear ratios between the engine shaft 11 and the propeller shaft 12.

When the sliding gear 31 is in mesh with the gear teeth 21 of the gear wheel 19 so that the mechanism is in forward gear, it may be desirable to eliminate the effect of the inertia mechanism when a substantially uniform speed of rotation is being imparted to the propeller shaft 12 and substitute for the variable brake a fixed brake.

For the purpose mentioned, the brake drum 22 and the brake band 23 are provided. As the uniform speed is approached, the transmission of power from the engine to the driving gear wheel 13 is temporarily discontinued, whereupon the movement of the inertia mechanism will cease and the gear wheel 19 will become substantially stationary. Then the brake band 23 is tightened or clamped about the brake drum 22 and the clutch is re-engaged to permit the transmission of power to the driving gear wheel 13. The result is that a definite fixed brake has been applied to the gear wheel 19 in place of the variable brake set up by the inertia mechanism, and the power that is transmitted to the propeller shaft 12 is entirely dependent upon the power transmitted by the engine shaft 11 and independent of the resistance to be overcome to the rotation of the shaft 12.

According to the embodiment illustrated by Fig. 5, the engine shaft 11 has a driving gear wheel 13 secured at one end thereof and adjacent to said driving gear wheel there is rotatably mounted a gear wheel 51 having a bearing sleeve 52 and internal and external gear teeth 53 and 54, respectively. Formed integrally with said gear wheel 51 are a gear wheel 55 and a brake drum 22 and about this brake drum there is fitted a brake band 23 adapted for operation in customary manner.

A gear wheel 19 having a bearing sleeve 20 and circumferential teeth 21 is rotatably mounted at the end of the propeller shaft 12 adjacent the driving gear wheel 13 and said gear wheel 19 carries a plurality of outwardly projecting spindles 24 in parallel arrangement with the shafts 11 and 12. On each spindle there is journaled a gear wheel 56 adapted to mesh with the driving gear wheel 13 and the internal teeth 53 of the gear wheel 51. The pitch circle diameters of the gear 21 of the gear wheel 19 and the external gear 54 of the gear wheel 51 are the same.

One member 57 of a dog clutch is formed integrally with the gear wheel 19 and the opposite clutch member 58 is formed integrally with a large gear wheel 59 having a shift collar 60 for operation by a shift fork 61. The combination unit comprising the gear wheel 59, collar 60 and clutch member 58 is slidably but non-rotatably mounted upon the propeller shaft 12 so that when the clutch 57—58 is engaged the gear wheel 19 transmits power to said propeller shaft.

A secondary shaft 62 is journaled in bearings parallel to the shafts 11 and 12 and fixed thereon is a gear wheel 63 adapted to mesh with the gear wheel 59 upon disengagement of the clutch 57—58 and a gear wheel 64 which is constantly in mesh with the teeth 55 of the gear wheel 51. The shaft 29, whereon is slidably mounted the gear wheel 31 which is adapted to engage either of the gears 54 or 21 is, for convenience of illustration, shown disposed opposite the secondary shaft 62. The shift fork 33 for operating said gear wheel 31 is linked with the shift fork 61 which operates the gear wheel 59 and clutch 58 so that one movement of a gear handle will simultaneously disengage the clutch 58—57, engage the gears 59—63, and shift the inertia brake from the gear teeth 54 to gear teeth 21, or vice versa as may be required.

As previously indicated, the shaft 29 is, for convenience, shown in a position opposite the shaft 62. However, in actual construction, the parts may be otherwise arranged about the axis of the shafts 11 and 12. The inter-connection between the shift forks 33 and 61 has not been shown since they may be inter-connected in any suitable fashion for simultaneous operation by a single shift lever. Since various arrangements may be employed for thus inter-connecting the shift forks 33 and 61, it is believed that specific illustration of the same is unnecessary.

When the gears 59—63, 64—55 and 31—21 are engaged and the clutch 58—57 is disengaged, the mechanism is in reverse and power is transmitted from the engine shaft 11 to the propeller shaft 12 in reverse direction. Upon disengagement of the gears 59—63, engagement of the clutch 58—57 and movement of the inertia brake gear 31 from the circumferential teeth 21 of the gear wheel 19 to mesh with the external teeth 54 of the gear wheel 51 the mechanism is placed into forward gear.

It will be observed that in the construction illustrated gears 64 and 55 are constantly in mesh, it being unnecessary to disengage these gears since it is only necessary to move gears 59 and 63 relatively into and out of mesh.

The substitution of a fixed brake for the variable brake set up by the inertia mechanism is effected in the same manner as already described with reference to Figs. 1 to 4 by clamping the brake band 23 tightly about the brake drum 22 of the gear wheel 51.

The modification illustrated in Fig. 6, comprises an engine shaft 11 and an adjacent propeller shaft 12 mounted in co-axial alignment. A driving gear wheel 13 is fixed at the end of the engine shaft 11 and a driven gear wheel 18 is secured at the end of the propeller shaft 12. A wheel 19 having a bearing sleeve 20 is rotatably mounted on the engine shaft 11 close to the gear wheel 13 and it carries a plurality of outwardly projecting spindles 24 in parallel arrangement with the shafts 11 and 12. On each spindle there is journaled a gear wheel 56 adapted to mesh with the driving gear wheel 13 and the internal teeth 53 of a gear wheel 51 which is rotatably and slidably mounted on the engine shaft 11 closely adjacent to the wheel 19. The gear wheel 51 has a shift collar 65, a bearing sleeve 52, external gear teeth 54 designed for engagement with the gear wheel 31 which is fixedly mounted on the shaft 29 and operatively connected to the inertia mechanism. Also rotatable on the spindles 24 are combination gear wheels 66, each consisting of a gear 67 of the same diameter as the gear wheel 56 and a smaller gear 68. The gears 67 are in mesh with the driven gear wheel 18 and with the internal gear teeth 69 of a ring or hoop gear wheel 70 which has a side flange 71 fitting close to the side of the gear 67 and encircled by a brake band 72 adapted to be clamped about its outer surface. The gears 68 of the combination gear wheels 66 engage with the gear teeth 73 of a gear wheel 74 which has a bearing sleeve 75 and is rotatably mounted upon the propeller shaft 12. The outer surface 76 of gear wheel 74 is encircled by a brake band 77 adapted to be operated in customary manner.

The mechanism is put into reverse gear by clamping the brake band 77 about the brake surface 76 to hold the gear wheel 74 stationary. Then the driving gear wheel 13, rotating in a clockwise direction, turns the gear wheels 56 independently in anti-clockwise direction about their spindles 24. Owing to the variable brake which is applied to the gear wheel 51, said gear wheels 56 run as a group on the internal teeth 53 of said gear wheel 51 so that the wheel 19 rotates in clockwise direction. The clockwise rotation of the wheel 19 causes clockwise rotation of the combination gear wheels 66 as the smaller gears 68 thereof mesh with the teeth 73 of the gear wheel 74. The anti-clockwise rotation of the driven gear wheel 18 caused by the clockwise rotation of the gear 66 about the spindles 24 is greater than the clockwise rotation that would be set up in said gear wheel 18 by the clockwise rotation of the wheel 19 if said gears 66 were motionless. Consequently, the driven gear 18 is turned in anti-clockwise direction and the mechanism is in variable reverse gear.

If the brake band 77 be released and the brake band 72 be clamped about the ring gear wheel 70, the mechanism is put into variable forward gear. The drive is then from the driving gear wheel 13, through the gear wheels 56 and gears 67 of the combination gear wheels 66 to the driven gear wheel 18. The variable brake set up by the inertia mechanism is applied to the gear wheel 51, as in reverse gear, to cause the wheel 19 to rotate in clockwise direction and that clockwise rotation causes the gears 67 of the combination gear wheels 66 to run on the internal teeth 69 of the braked ring gear wheel 70.

When the mechanism is operating at a uniform speed, a fixed drive can be substituted for the variable drive by sliding the gear wheel 51 along the engine shaft 11 so that the internal teeth 53 engage the gears 67 as well as the gear wheels 56 so that the external teeth 54 disengage from the gear wheel 31 and inertia mechanism. At the same time the brake band 72 about the ring gear wheel 70 must be unclamped.

Modified constructions of apparatus for setting up damping effects of vibratory movements are illustrated by Figs. 7 to 10. Reference being made to Fig. 7, the connecting rod 36 is mounted at one end on an eccentric 35 turning about a shaft 29, and its opposite end is connected at 78 to a bar 79 which is pivotally suspended at its upper end to a slide 39 and has a weight 80 at its lower end. The slide 39 is movable in guides 44 and is acted upon by strong helical springs 49 having their opposite ends anchored to the slide 39 and to blocks 46 secured to the guides 44. A rod 45 is fitted through the springs 49 and slide 39 and fastened to the blocks 46 to maintain said springs in operative position.

If the shaft 29 turns at such a speed that the connecting rod 36 causes the pivotally suspended bar 79 to vibrate with its natural frequency, no back pressure or damping will be created, but as the period of vibration of the bar 79 decreases the slide 39 commences to move along the guides 44 against the forces of the springs 49 so that said bar 79 pivots about an intermediate point instead of about its point of suspension and it oscillates with damped vibrations. Thus, there is set up a back pressure to prevent rotation of the shaft 29.

According to the modification shown in Figs. 8 and 9, a weighted slide 39 is movable longitudinally in guides 44 and has a cage 81 which is pivotally mounted therein on pintles 81a. The connecting rod 36, which is secured at one end to an eccentric 35, passes through the cage 81 and it has collars 82 secured at its opposite end and at an intermediate point between the cage 81 and the eccentric 35. Strong helical springs 49 are fitted about the rod 36 and have their opposite ends secured to the cage 81 and collars 82.

Upon rotation of the eccentric 35 and connecting rod 36, the weighted slide 39 will be moved in the guides 44 by the action of the springs 49, but the phase difference between the movements of the connecting rod 36 and slide 39 will be 90°. Consequently, there will be damping of the movement of the connecting rod 36 and the shaft 29 whereon the eccentric 35 is mounted will be subjected to a variable braking effect which is dependant upon the speed of rotation of said shaft.

According to the modification illustrated by Fig. 10, the slide 39 is of hollow construction and is partially filled with a heavy liquid, such as mercury, indicated by 83. Upon movement of the slide 39 in reciprocatory manner there will be slight lag in the movement of the liquid 83. The movement of the liquid in one direction will therefore tend to prevent motion of the slide 39 as it commences to move back along its path during reciprocatory movement. That is to say, the movement of the slide 39 will be damped.

What I do claim is:

1. An improved power transmission mechanism comprising, a shaft, a fly-wheel on said shaft, a slide movable on the rim of the fly-wheel, springs connected to the slide and to the fly-wheel whereby movement of said slide imparts rotational movement to said fly-wheel, and an epicyclic gear mechanism connected to said slide and adapted to impart vibratory movement to the latter.

2. An improved power transmission mechanism according to claim 1, wherein guides for the slide and the springs are provided on the periphery of the fly-wheel, and wherein the slide is operatively connected to the epicyclic mechanism through an eccentric mechanism.

3. An improved power transmission mechanism comprising, fixed guides, a slide longitudinally movable in said guides, springs connected to the slide and to the guides, a bar pivoted at its upper end to the slide, a weight at the lower end of said bar and an epicyclic gear mechanism having one of its rotating elements operatively connected to said bar through an eccentric mechanism.

4. An improved power transmission mechanism comprising, fixed guides, a slide longitudinally movable in said guides, a cage pivotally mounted in said slide, a rod passing longitudinally through said cage, springs on said rod connected to said cage, and an epicyclic gear mechanism having one of its rotating elements operatively connected to said rod through an eccentric mechanism.

5. An improved power transmission mechanism comprising, fixed guides, a hollow slide longitudinally movable in said guides, a heavy liquid in said slide, and an epicyclic gear mechanism having one of its rotating elements operatively connected to said hollow slide through an eccentric mechanism.

6. An improved power transmission mechanism comprisig, a driving shaft, a driven shaft axially aligned with said driving shaft, a primary gear wheel fixed on said driving shaft, a primary gear wheel freely rotatable about the common axis of said driving and driven shafts, a supporting wheel rotatable about said common axis, spindles fixed to said supporting wheel, secondary gear wheels rotatable on said spindles adapted to mesh with the fixed and the freely rotatable primary gear wheels, external teeth on the freely rotatable primary gear wheels, a subsidiary shaft, a gear wheel on said subsidiary shaft adapted to mesh with said external teeth, eccentrics on said subsidiary shaft, elements connected to said eccentrics so constructed and arranged that they will pulsate with damped vibratory movements upon rotation of said eccentrics, and means for transmitting motion from said supporting wheel to said driven shaft.

7. An improved power transmission mechanism according to claim 6 and wherein a fixed brake is substituted for the variable brake provided by the inertia mechanism.

8. An improved power transmission mechanism according to claim 6, wherein the freely rotatable primary gear wheel is mounted on the driving shaft and consists of two co-axial gears, one of smaller diameter than the other, a fixed gear wheel is secured at the end of the driven shaft, the secondary gear wheels consist of three gear wheels of decreasing diameters in mesh respectively with the fixed primary gear wheel, the small gear wheel of the freely rotatable gear wheel and the fixed wheel on the driven shaft, and wherein the supporting wheel has peripheral teeth and a brake drum.

9. An improved power transmission mechanism according to claim 6, wherein freely rotatable primary gear wheel has internal teeth to mesh with the secondary gear wheels, a relatively small diameter gear wheel and a brake drum formed integrally therewith; the supporting wheel is rotatable on the drum shaft and has a clutch member, a slidable reversing gear wheel having a complementary clutch member which is slidably but non-rotatably mounted on the driven shaft; and the secondary shaft has fixed thereon two gear wheels to mesh with the small diameter wheel of said freely rotatable primary gear wheel and with said reversing gear wheel upon disengagement of said clutch members.

10. An improved power transmission mechanism according to claim 6, wherein the tertiary gear wheel is fixed at the end of the driven shaft, a freely rotatable tertiary gear wheel having a brake drum is mounted on the driven shaft, two independent secondary gear wheels are rotatable on each spindle carried by the supporting wheel, one of which meshes with the fixed primary gear wheel and the other meshes with the fixed tertiary gear wheel and the freely rotatable tertiary gear wheel, a ring gear wheel is fitted about the second secondary gear wheel and has a brake drum, and wherein the freely rotatable primary gear wheel has internal teeth to selectively mesh with the first-mentioned secondary gear wheel or with both of said secondary gear wheels simultaneously.

11. A transmission comprising a driving shaft and a driven shaft; an epicyclic gear train interconnecting said shafts, said train including a rotatable member carrying the planetary gears of said train; means operative to impart selectively forward or reverse rotation to said driven shaft, said means including a gear fixedly mounted on said driven shaft in engagement with the planetary gears of said train and a brake selectively operative to hold said rotatable member; and means operative to selectively engage said rotatable member of said epicyclic gear train and convert movement thereof to an oscillatory movement, said last named means including a device operative to dampen said movements.

12. A transmission comprising a driving shaft and a driven shaft, an epicyclic gear train interconnecting said shafts, said epicyclic gear train including two sun gears of different pitch diameters respectively connected to said shafts, planet gears each having a plurality of axially spaced sections of different pitch diameter with the several sections of the same pitch diameter on the respective planet gears arranged in the same plane, the sun gear on one of said shafts in mesh with the planet gears in the plane which includes the axial sections of greatest pitch diameter, and the sun gear on said driven shaft in mesh with the planet gears in the plane which includes axial sections of smaller pitch diameter, a third sun gear in mesh with said planet gears in a plane which includes axial sections having a pitch diameter intermediate of the pitch diameters in mesh with the sun gears on said driving and driven shafts, a rotatable carrier for said planet gears, reciprocable means selectively connectable with either said third sun gear or said planet gear carrier, and means for dampening the vibratory movement of said reciprocable means.

13. A transmission comprising a driving shaft, a driving gear on said driving shaft, a driven shaft, a driven gear on said driven shaft, an epicyclic gear train having the planetary elements thereof constantly in mesh with said driving gear, a rotary carrier for said planet gearing, an internal gear in mesh with said planet gears, a reciprocable member, means for selectively connecting said reciprocable member with said carrier and said internal gear, and means for dampening the vibratory movement of said reciprocable member.

14. A transmission comprising a driving shaft, a driving gear on said driving shaft, a driven shaft, a driven gear on said driven shaft, an epicyclic gear train having the planetary elements thereof constantly in mesh with said driving gear, a rotary carrier for said planet gearing, an internal gear in mesh with said planet gears, a counter-shaft driven from said internal gear and carrying a spur gear adapted to mesh with said driven gear, reciprocable means, means for simultaneously engaging said reciprocable means with said carrier and meshing said spur gear with said driven gear, and alternatively moving said spur gear relatively out of mesh with said driven gear and connecting said reciprocable means with said internal gear, and means for dampening the vibratory movement of said reciprocable means.

15. A transmission comprising a driving shaft, a driving gear on said driving shaft, a driven shaft, a driven gear on said driven shaft, an epicyclic gear train having the planetary elements thereof constantly in mesh with said driving gear, a rotary carrier for said planet gearing, an internal gear in mesh with said planet gears, a counter-shaft driven from said internal gear and carrying a spur gear adapted to mesh with said driven gear, reciprocable means, means for simultaneously engaging said reciprocable means with said carrier and meshing said spur gear with said driven gear, and alternatively moving said spur gear relatively out of mesh with said driven gear and connecting said reciprocable means with said internal gear, means for dampening the vibratory movement of said reciprocable means, and complementary jaws on said carrier and driven gear adapted to inner-engage when said driven gear is out of mesh with said spur gear.

16. An improved variable speed transmission mechanism comprising a driving shaft; a driven shaft axially aligned with said driving shaft; a driving train of epicyclic gears comprising a primary driving gear wheel fixed on said driving shaft, a supporting wheel rotatable about the common axis of said driving and driven shafts, a plurality of spindles fixed to said supporting wheel and extended parallel to said common axis, a gear wheel freely rotatable about said common axis, and planetary gear wheels rotatably mounted on said spindles and in engagement with said freely rotatable gear wheel and with said driving gear wheel; a driven gear non-rotatably mounted on said driven shaft; and means operatively connecting one of said wheels freely rotatable about said common axis with said driven gear on said driven shaft, said last named means including an inertia mechanism operatively engaging the said selected wheel.

17. An improved variable speed transmission mechanism according to claim 16 wherein the freely rotatable gear wheel is provided with two external gears differing in diameter; the supporting wheel is provided with an external gear; and each of the planetary gear wheels embodies three gears of decreasing diameter in mesh respectively with the fixed primary driving gear wheel, the small gear of the freely rotatable gear wheel, and the fixed driven gear on the driven shaft.

18. An improved variable speed transmission mechanism according to claim 16, wherein the freely rotatable gear wheel is provided with an external gear and an internal gear; the supporting wheel is provided with an external gear and a clutch member; the non-rotatable driven gear is slidably mounted on the driven shaft and carries clutch member adaptable to engage the member carried on the supporting wheel; and each planetary gear wheel carries a single gear which is in engagement with the internal gear on the freely rotatable gear wheel.

19. An improved variable speed transmission mechanism according to claim 16, wherein the freely rotatable gear wheel is provided with an external and an internal gear; each planetary gear wheel carries a single gear which is in engagement with the internal gear of the freely rotatable gear wheel; and wherein the means connecting the driven gear on the driven shaft operatively with the freely rotatable supporting wheel comprises gear elements rotatably mounted on the spindles carrying the planetary gears, each of which gear elements carries a gear of larger and a gear of smaller diameter, a gear ring rotatably mounted about the common axis of the driven and driving shafts which ring is provided with an internal gear in engagement with the gears of larger diameter carried by said gear elements, braking means operative to hold said gear ring against rotation, a wheel rotatably mounted about the driven shaft which wheel is provided with an external gear in engagement with the gears of smaller diameter carried by said gear elements, and braking means operative to hold said last named wheel against rotation.

KENNETH GEORGE DETHRIDGE.